United States Patent [19]

Rose et al.

[11] 4,266,936
[45] May 12, 1981

[54] BRAILLE DISPLAY READER

[75] Inventors: Leonard Rose, 184 Seapit Rd., East Falmouth, Mass. 02536; Stanley E. Rose, 9 Broadway, Saugus, Mass. 01906

[73] Assignees: Leonard Rose; Stanley Rose, both of Falmouth, Mass.

[21] Appl. No.: 958,253

[22] Filed: Nov. 6, 1978

[51] Int. Cl.³ .................... G09B 21/02; G06K 9/00
[52] U.S. Cl. .................................... 434/114; 340/407
[58] Field of Search ............... 35/35 R, 35 A, 35 C, 35/8 A; 340/407

[56] References Cited

U.S. PATENT DOCUMENTS

| | | | |
|---|---|---|---|
| 3,230,644 | 1/1966 | Irazoqui | 35/35 A |
| 3,289,327 | 12/1966 | Chevillon | 35/35 A |
| 3,395,247 | 7/1968 | Fieldgate | 35/35 A |
| 3,548,162 | 12/1970 | Young et al. | 35/35 A |
| 3,594,787 | 7/1971 | Ickes | 35/35 A |
| 3,659,354 | 5/1972 | Sutherland | 35/35 A |
| 3,736,672 | 6/1973 | Skewis | 35/35 A |
| 3,793,471 | 2/1974 | Mason et al. | 35/35 A |
| 3,800,315 | 3/1974 | Bu drose | 35/35 C |
| 3,851,745 | 12/1974 | Okazaki et al. | 35/35 A |
| 3,866,020 | 2/1975 | Charlesworth | 35/35 A |
| 4,010,556 | 3/1977 | Ellsworth et al. | 35/35 A |

FOREIGN PATENT DOCUMENTS 255644 3/1970 U.S.S.R. .................................... 340/407

OTHER PUBLICATIONS

*IBM Technical Disclosure Bulletin;* vol. 17, No. 8; Jan. 1975; p. 2471.
Snelders, J. A. H. and Spanjersberg, H. A.; "Braille Apparatus Using Microprocessors"; 1976; pp. 125-132.

*Primary Examiner*—Vance Y. Hum
*Attorney, Agent, or Firm*—Sewall P. Bronstein; William H. Lee

[57] ABSTRACT

A portable braille display unit which presents an entire page of braille characters in response to data stored on a storage medium, such as a tape cassette. The display unit is the size of a conventional braille page, and the display unit may be made portable and self-powered. Each braille character is displayed by a braille cell display module in which spring actuated pins are controlled by bimetallic latches. Each module includes six pins which comprise the six dots of each braille cell. To display braille characters, an electrical current is applied to resistively heat selected ones of the bimetallic latches. In response to this current the selected bimetallic latches bend and disengage from the pin, allowing a compressed spring to move the pin upward through the surface plate to display a braille dot. The spring maintains the pin in this position without requiring power from the power supply.

25 Claims, 16 Drawing Figures

BRAILLE DISPLAY READER

FIELD OF THE INVENTION

The present invention is related to braille reading devices for the blind and in particular to a system for providing a tactile representation of a page of braille characters.

BACKGROUND OF THE INVENTION

Over the years many aids have been developed for blind people to compensate for the lack of visual reading ability which they no longer have. Of these many aids the most well known and most widely used is braille. In braille letters are represented by embossed characters made up of from one to six dots arranged in a configuration of two columns of three dots each. A blind reader touches braille characters with his fingers to identify the letters and words which he "reads". Since braille was first developed by Louis Braille in 1852, many blind persons have learned to read braille and numerous texts have been transcribed into braille. However, there are presently significant problems with providing and disseminating large numbers of braille copies of textual material due to several factors.

First, it is difficult or impractical to produce a large number of copies of most braille books. Most braille is written in grade 2 braille, which uses a kind of shorthand or speed writing to reduce the number of braille cells needed to transcribe the textual material to be read. Grade 2 braille includes many contractions and abbreviations for commonly used English words and phrases. While computer translators for converting English into grade 2 braille are now being developed, at the present time the vast majority of braille translations are provided by volunteers who are skilled in grade 2 braille and who produce braille pages using a manually operated six-key braille typewriter. This method has the disadvantage that only one copy may be made at a time. To make additional copies of such material, a thermal forming process may be used by which a polyvinyl choloride sheet is molded the paper page original to duplicate it. This process can only be done one page at a time which make the production of a braille copy of a book a very slow and tedious process. This process is also expensive since each sheet costs approximately 5 cents per sheet, in addition to the cost of the thermal forming equipment and any labor costs. While large quantities of braille pages may be produced by using a printing press modified to emboss braille on paper sheets using braille zinc plate masters, printing such braille pages is expensive because of the necessity of a modified printing press and the cost of producing braille zinc plate masters. Accordingly, it is economically impractical to use this process to produce small quantities of a book; and this process is limited to those textual materials having a wide potential readership.

Storing and distributing braille books is hindered due to the bulk of braille materials. Braille is typically embossed on sheets having dimensions of 11 inches by 11½ inches. These sheets each contain 25 rows of 40 cells each. Text written in grade 2 braille requires, on the average, two sheets of braille for each single sheet of printed textual material. Thus, a 200 page book requires 400 pages of braille. When transcribed into braille a single book will require several individual volumes of braille pages. Each of these volumes is limited to approximately 100 braille pages by two factors. First, the embossed braille pages are thicker and require more room than flat printed pages. Second, braille pages must lie substantially flat when the volume is open in order to be capable of being read quickly and comfortably by a braille reader; and problems with binding braille pages together so that they will lie flat limits braille volumes to approximately 100 pages. The result is that textual material which can be conveniently contained within one or two ink-print books of reasonable size requires many braille volumes which are heavy and large in size.

Due to the large volume required by braille materials, many libraries are unable to maintain more than a few braille volumes on the shelves due to space restrictions. Blind students, who require several different books for their different classes, also have difficulty in carrying around the many bulky braille volumes required to transcribe each textbook.

Several systems have been developed which electronically store data representative of braille characters and reproduce that data for a blind reader. All previous systems, however, have suffered from the drawback that they can only reproduce from a few characters to, at most, a single line of braille. It is frequently desirable for both sighted and sightless readers to refer back to previous material on a page or on a previous page. This is especially important, of course, when studying complicated subjects. Examples of this are charts, tables, musical, and mathematical materials. Electronic braille reproduction devices which provide only a single line do not allow a braille reader to easily refer back to previous material or to deal with tabular or multi-line materials. Whereas in a conventional braille book, a blind reader may skim or quickly look for previous material by reading a line or two on a page to determine the location of that material, currently available electronic braille reproduction devices which display only a single line at a time make such reference back to previous material confusing, difficult, and time consuming. It has also been found that a braille reader reads much more slowly when presented with a single line at a time in comparison with the speed at which the full pages of braille books may be read.

SUMMARY OF THE INVENTION

Briefly, the present invention includes a braille display unit, which operates in the following manner. Codes representing conventional braille characters are recorded on a storage medium. The preferred medium is magnetic tape cassettes, which are conveniently and readily available. The stored information is read one page at a time into an intermediate memory. Data from the intermediate memory is fed to an electronic device which controls a display unit which tactilely reproduces the braille characters on a display surface which is the same size as that of a standard braille book page.

The present invention has many advantages over currently available methods for providing blind persons with braille reading materials. The present invention stores data representative of braille characters electronically, preferably on conventional tape cassettes. This has many advantages over conventional braille books which contain embossed paper or thermal formed plastic pages. The bulk, weight, and expense of individual braille books and the expense of storage facilities for conventional braille books are greatly reduced. Since tape cassettes having data stored thereon may be quickly and cheaply reproduced, books transcribed into braille on cassettes for use with the present invention may be easily duplicated, in contrast with embossed braille pages which are reproduced only by slow, expensive thermo-forming except where the demand is sufficient to economically justify printing a braille book with embossed braille zinc plates. Presently blind persons' access to braille materials is limited to regional braille libraries with limited numbers of books. The present invention allows local libraries to easily and cheaply acquire a large braille collection in the form of cassettes at a moderate cost of acquisition and storage.

The present invention presents braille on the top surface of the display unit which is the size of a conventional braille page, approximately 12 inches by 12 inches. The entire display unit is approximately 4 inches thick and contains the tactile reproducers, electronics, tape transport, and power supply. Thus, the present invention has the additional advantage over present electronic braille readers in that it is portable and may be easily taken from place to place. Virtually all presently available electronic braille reading devices are relatively large, heavy and essentially nonportable. They have high power demands which generally cannot be met for a useful period of time by means of batteries. Thus, these devices are restricted to being used at a single location convenient to AC power.

The present invention incorporates a novel braille cell display module, which displays braille characters by the use of spring actuated pins which are controlled by bimetallic latches. Each module includes six pins which comprise the six dots of each braille cell. These pins extend through holes in a surface plate to provide a tactile representation of the braille characters. Prior to displaying a page, all pins for each character on the page are placed in a "down" position. The pins are maintained in the "down" position by the bimetallic latching device which engages each pin and holds it down. To display braille characters, an electrical current is applied to selected ones of the bimetallic latches. In response to this current the selected bimetallic latches bend and disengage from the pin, allowing the compressed spring to move the pin upward through the surface plate to display a braille dot. The spring maintains the pin in this position without requiring power from the power supply, and once a page has been displayed on the display unit, no further power is required to maintain the display for an indefinite period of time. Prior to displaying a subsequent page, the raised pins are mechanically moved downward until all of the bimetallic latches have engaged the pins to hold them in the "down" position.

DESCRIPTION OF THE DRAWINGS

These and other advantages of the present invention will become more clear upon reading the following detailed description of the invention in conjunction with the accompanying drawings, of which.

DETAILED DESCRIPTION OF THE PREFERRED EMBODIMENT

One of the major difficulties in building electromechanical systems which can reproduce a large number of braille characters has been in developing a mechanism for mechanically producing the tactilely-sensible braille dots which is small enough that a large number of braille characters may be reproduced with the normal braille spacing and yet inexpensive enough that the large number of mechanisms needed may be provided at a cost which is not prohibitive. For example, a page of braille consists of 25 lines of 40 characters each, each character having up to six possible dots. Thus, to reproduce a page of braille requires approximately 6,000 mechanisms, and these 6,000 mechanisms must fit within an area of approximately 11½ by 11 inches.

A key feature of the present invention is a unique actuator mechanism which includes a thermally-actuated, bimetallic element which in response to an electrical signal applied thereto allows an associated spring loaded plunger to move to provide a raised dot of a braille character.

Figure 1:
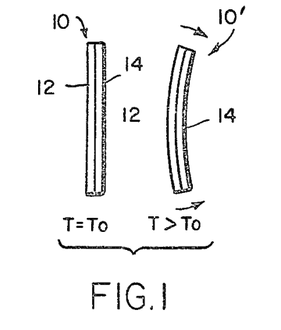
FIG. 1 illustrates the functioning of a bimetallic element.

Referring to FIG. 1 there is shown a bimetallic strip 10. Such strips are well known and may be commercially obtained from many sources. The bimetallic strip is formed of two different metals having different temperature coefficients. This is shown in FIG. 1 wherein a strip 12 of a first metal is bonded to a strip 14 composed of a second metal having a dissimilar thermal expansion characteristic. Typical pairs of metal include invar and copper.

If the bimetallic strip 10 is assembled so that it is straight at a particular temperature $T_0$, as shown in FIG. 1 by strip 10, raising the temperature above $T_0$ causes one strip to expand at a greater rate than the other strip due to the dissimilar temperature coefficients. For example, if strip 12 has a larger temperature coefficient than strip 14, if the temperature of the bimetallic strip is raised above $T_0$, the strip will bend as shown at 10' in FIG. 1.

Figure 2A:
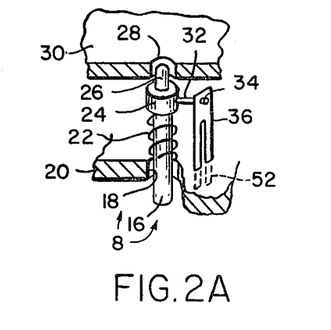
FIGS. 2a and 2b show the operation of a spring loaded plunger in conjunction with a bimetallic latch.
Figure 2B:
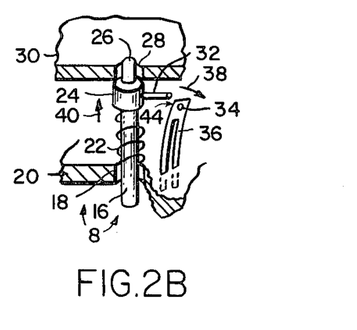

Referring to FIGS. 2a and 2b a novel actuator 8 for providing a tactilely-sensible braille dot is shown. A plunger 16 extends through a hole 18 in a bottom plate 20. Plunger 16 is typically circular in cross-sectional area. A spring 22 encircles the portion of plunger 16 extending through hole 18 and abuts against a shoulder 24 formed on the top portion of plunger 16. Spring 22 is larger in diameter than hole 18 and and the bottom end of spring 22 rests on plate 20. Spring 22 is compressed by shoulder 24 and bottom plate 20 and provides an upward force on plunger 16.

Extending upward from shoulder 24 is a pin 26. Pin 26 is the actual part of the mechanism which is raised to "display" a braille dot and which is tactilely sensed by a person. The top of pin 26 is rounded and extends into a hole 28 in a top plate 30.

Extending from one side of plunger 16 is a latching pin 32. In the position illustrated in FIG. 2a, "display" pin 26 is positioned with respect to plate 30 such that the top of pin 26 lies within hole 28 and flush with the top surface of top plate 30. When in this position latching pin 32 fits within a hole 34 in a bimetallic element 36 which is attached to bottom plate 20. Bimetallic element 36 retains plunger 16 in the position shown in FIG. 2a against the upward force provided by spring 22 when latching pin 32 is within hole 34.

FIG. 2a shows the actuator 8 in a position where a braille dot is not "displayed" by the actuator. Bimetallic element 36 is composed of a bimetallic strip and is oriented with respect to plunger 16 such that element 36 bends away from plunger 16 when it is heated. To display a braille dot, bimetallic strip 36 is heated causing it to bend away from plunger 16 and causing hole 34 in bimetallic element 36 to disengage from latching pin 32. Plunger 16 is then no longer retained in the retracted position, and the force of spring 22 causes plunger 16 to move upward until the top surface of shoulder 24 hits the bottom surface of plate 30. In this position pin 26 extends above the top surface of top plate 30 to provide a tactilely-sensible representation of a braille dot. The surfaces of pin 26 and/or top plate 30 may be finished in a matte texture to decrease the tendency of smooth surfaces to desensitize the fingertips after an extended period of reading braille.

This is shown in FIG. 2b wherein bimetallic element 36 has been heated so that it moves in the direction denoted by arrow 38 away from plunger 16 disengaging latching pin 32. In response the plunger moves upward as shown by arrow 40. Display pin 26 extends approximately 0.023 inches above the top surface of top plate 30. This is the standard height of braille dots. Other dimensions may prove useful, however, in providing more readily recognized characters. In particular "jumbo braille" or other non-standard braille sizes may be used to accommodate people with lower than average tactile sensitivity, such as children and elderly persons.

Figures 3A, 3B:
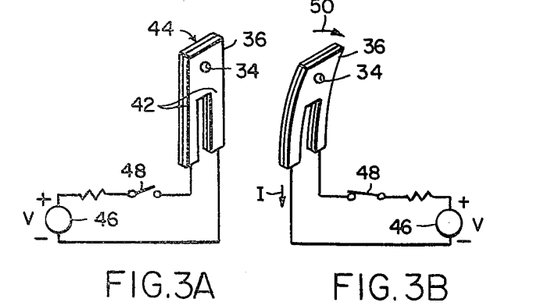
FIGS. 3a and 3b show the deformation of the bimetallic latch by application of an electric current thereto.

Bimetallic elements 36 are selectively heated in the following manner. The bimetallic elements are formed in a "U" shape, which is inverted, so that the two legs of the "U" contact and are supported by bottom plate 20; and the hole 34 in bimetallic element 36 is formed in the middle section of the "U", which connects the two legs. This is shown more clearly in FIG. 3a where a bimetallic element 36 is shown in its nondeformed position as it would be when retaining plunger 16 in the retracted position. Bimetallic element 36 may be selectively heated by applying a potential across the two legs 42 of the "U" shaped element. This is shown schematically in FIG. 3a wherein a voltage source 46 is directly connected to one leg 42 of bimetallic element 36 and is connected via a switch 48 to the other leg thereof. By closing switch 48, a current is made to flow up one leg 42 of the bimetallic element across the top section 44 and down the other leg 42. Since bimetallic element 36 has an appreciable resistance, this flow of current produces a resistive heating of the bimetallic element causing the element to bend. This is shown in FIG. 3b where switch 48 has been causing a current I to flow through bimetallic element 36 heating the element and causing it to bend in a direction shown by arrow 50. Thus, selected bimetallic elements from among a large number of actuators may be easily heated to cause the associated plunger 16 to "display" a braille dot.

Referring back to FIGS. 2a and 2b, where bimetallic element 36 is shown anchored to bottom plate 20, it can be seen that conductors for providing current to the legs of bimetallic element 36 may be easily and inexpensively provided by forming printed circuit conductors on the top and/or bottom surfaces of bottom plate 20. In this case the legs 42 of bimetallic element 36 would typically have lugs 52 which extend down from the legs 42. These legs are inserted in holes formed in base plate 20 and may be soldered to the printed circuit conductors to provide electrical connection thereto. Although only a single actuator 8 is shown in FIGS. 2a and 2b, in an actual braille reproducer a very large number of these actuators are used and these actuators are very closely spaced. Printed circuit conductors are ideally suited for providing electrical connections to bimetallic elements 36 since they may be easily and inexpensively fabricated to very close tolerances on base plate 20 to provide interconnection to the bimetallic elements 36.

Once latching pin 32 has been released by bimetallic element 36 so that plunger 16 moves to the extended position, the plunger will remain in this position displaying a braille dot indefinitely without requiring further electrical power. This is advantageous, especially for portable systems, since it may be desirable to maintain the display of a page of braille characters for a long period of time.

To return plunger 16 to its retracted position, a downward force is applied to plunger 16, which then moves downward recompressing spring 22 until latching pin 32 reengages hole 34.

For the sake of illustration the magnitude of the movements of plunger 16 and bimetallic element 36 are exaggerated in the drawings. As explained above the total vertical travel of plunger 16 is on the order of 0.023 inches. In actual practice plunger 16 and latching pin 32 do not move so far as to completely clear the top section 44 of bimetallic element 36. Typically, the bimetallic element is heated by a short pulse of current; and after the current is removed, bimetallic element 36 returns to its normal temperature and tends to move back to its original position until the top section 44 abuts the end of latching pin 32. Thus, as plunger 16 is moved downward, the end of latching pin 32 slides along the top section 44 of bimetallic element 36 until it reengages hole 34. It should be clear that other methods may be used to allow latching pin 32 to reengage bimetallic element 36 should the vertical travel required of plunger 16 cause latching pin 32 to rise completely above bimetallic element 36. For example, the bottom of latching pin 32 could be bevelled, or alternatively the top section 44 of bimetallic element 36 could be bent at an angle away from plunger 16 to allow latching pin 32 to bend bimetallic element 36 away from plunger 16 as plunger 16 moves downward.

The following equations and analysis allow one to determine the parameters necessary to design an actuator 8 as shown in FIGS. 2a and 2b. The thermal deflection D for a bimetallic element as shown in the figures is given by:

$$D = \frac{0.53 \, F \cdot \Delta T \cdot L^2}{t} \tag{1}$$

where F is a property of the material, ΔT is the temperature rise, L is the length of bimetallic element 36, and t is the bimetallic element thickness. To take an actual example for bimetallic elements made of Truflex, manufactured and sold by Texas Instruments, F equals $215 \times 10^{-7}$, L is 0.5 inches, t is 0.005 inches, and T is typically 75 degrees F. With these parameters the available deflection D is 0.0432 inches.

When the thermal element is heated and constrained in motion, it will develop a force P in ounces given by:

$$P = \frac{2.12 \, E \cdot F (\Delta T) \, wt^2}{L} \quad (2)$$

where E is the modulus of elasticity and w is the width of the bimetallic element. For the material being considered, E is $19 \times 10^6$ psi giving a force P of 0.125 ounces. For a coefficient of friction of 0.5 between latching pin 32 and the inside surface of hole 34 and for a 2 ounce upward pressure provided by spring 22, bimetallic element 36 must overcome a frictional force of 0.5 ounces to release plunger 16. The temperature change ΔT required to overcome this frictional force may be determined from equation (2), and a 30 degree F. rise in temperature is required to overcome the frictional force. For a total temperature rise of 75 degrees F., this leaves 45 degrees F. for deflection. Thus, the maximum usable deflection for this temperature rise may be determined by equation 1 where ΔT equals 45 degrees F. This maximum usable deflection for a temperature rise of 75 degrees F. is 0.026 inches. This value determines the length of pin 32, which should be slightly shorter than 0.026 inches to ensure disengagement from hole 34 in response to the above-calculated displacement of bimetallic element 36.

Figure 4A:
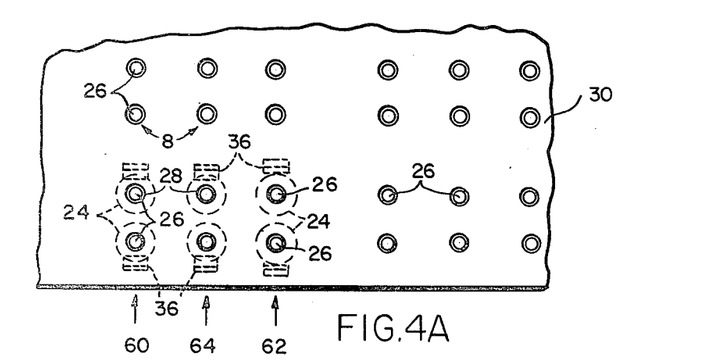
FIGS. 4a, 4b, and 4c are top, side and front views of a portion of the display unit showing the construction of braille cell display modules and illustrating an alternate embodiment of the actuators.
Figure 4B:
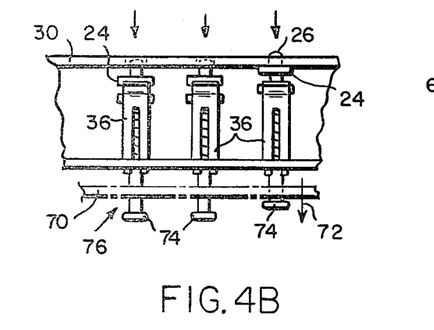
Figure 4C:
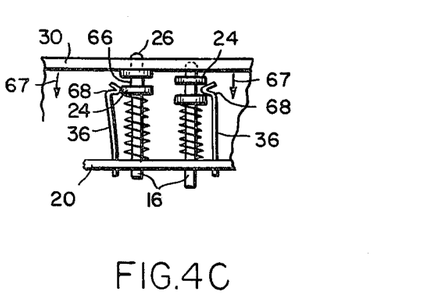

FIGS. 2a and 2b show a single actuator 8 displaying a single braille dot for purposes of explanation. In actual practice, of course, large numbers of actuators are required to display a plurality of braille characters. As it is well known, a single braille character includes six dot positions composed of two columns of three dots each. These dots are on centers approximately ⅛ inch apart. FIGS. 4a, 4b, and 4c show a preferred actuator arrangement for displaying a number of braille characters shown, and additionally illustrate an alternate embodiment of the actuator. FIG. 4a is a top view looking down on top plate 30 showing the arrangement of actuators for displaying four braille characters. FIG. 4b is a side view and FIG. 4c is an end view of the actuator arrangement for a single braille character. The four braille characters shown in FIG. 4a occupy an area approximately ¾ inches by ⅜ inches. There are 24 braille dot positions, and thus 24 actuators must fit in this very small area. The present invention is capable of being economically fabricated in such a size so as to permit the actuators to be placed with this high density or higher.

FIGS. 4a, 4b, and 4c illustrate an alternate embodiment of the actuators. This alternate embodiment is most clearly illustrated in FIG. 4c. From FIG. 4c, it can be seen that in place of latching pin 32 and corresponding hole 34 in the bimetallic element 36, each plunger 16 has a groove 66 formed in the shoulder 24 of the plunger. The top end of each bimetallic element 36 has a hook-shaped bend 68 which engages groove 66 to hold the plunger 16 in the retracted position. This is illustrated by the right hand actuator in FIG. 4c. In response to an electrical signal applied to the bimetallic element, the bimetallic element bends away from the plunger 16 as described above and releases the plunger. After the electrical signal is removed and the bimetallic element 36 has cooled, the hook-shaped bend 68 of the bimetallic element comes to rest upon the lower portion of shoulder 24 abutting groove 66, as shown in FIG. 4c. When the plunger 16 is lowered, bend 68 reengages groove 66 in the plunger to retain the actuator in the nonactivated position.

Referring to FIGS. 4a and 4b, the preferred positioning of the bimetallic elements included in the actuators making up a braille character is shown. As it is well known, a braille character is made up of two parallel columns having three dots each. As shown in FIG. 4a, the bimetallic may be positioned beside the plunger on the outside of each character. This arrangement is particularly advantageous if the bimetallic elements are formed or assembled in continuous strips, as described below in connection with FIGS. 5a and 5b. FIG. 4b is a side view of the arrangement illustrated in FIG. 4a. Although not drawn in FIG. 4a, each of the other characters shown there is formed by six actuators having the same respective orientation between plungers 16 and bimetallic elements 36. Thus, the present invention allows a very high density of elements to be assembled in a very small space.

Figure 5A:
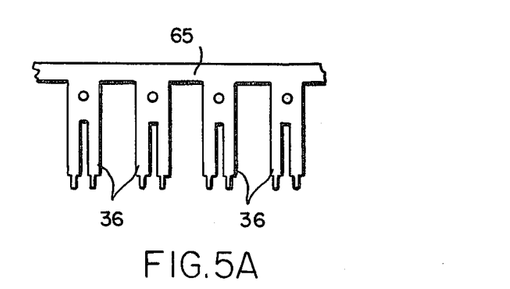
FIGS. 5a and 5b illustrate two methods of fabricating and assembling the bimetallic elements which allows rapid assembly of the display unit.

The illustration in FIG. 4a of one arrangement of actuators and bimetallic elements 36 does not preclude other arrangements. However, the arrangement shown in FIG. 4a has the advantage that all of the bimetallic elements are located in a series of rows, and this arrangement may lead to easier assembly techniques. For example, the bimetallic elements 36 are typically formed by stamping these elements from a larger sheet of bimetallic material. To allow a large number of bimetallic elements to be assembed to bottom plate 20 with a minimum of fabrication efort, the bimetallic element may be formed in the stamping process by leaving them connected by a strip which is later detached and discarded. This is shown in FIG. 5a where a plurality of bimetallic elements 36, which have been stamped from a sheet, are connected to one another in a fixed relationship by a top piece 65. As can be seen from FIG. 4a for a page of 24 lines of 40 braille characters, each of the bimetallic elements of a character is parallel and coplanar with the elements of characters in that column in other rows. By fabricating the structure shown in FIG. 5 with the proper spacings between bimetallic elements 36, the parallel bimetallic elements in a column may be simultaneously positioned and inserted into bottom plate 20. Each of the bimetallic elements 36 is then attached to bottom plate 20. Typically, bottom plate 20 is a printed circuit board which provides electrical paths to each of the bimetallic elements and the elements are quickly and easily fastened to bottom plate 20 by wave soldering or the like.

Following attachment of the bimetallic elements 36 to bottom plate 20, the top piece 65 connecting the bimetallic element is then removed. This may be accomplished by clipping off the top piece 65. Alternately, the stamping process may partially cut through the bimetallic sheet where the top piece 65 and the bimetallic elements are joined so that the top portion 65 may be snapped off. Other methods of fabrication may also be used. Since a sheet of braille characters includes 6,000 elements, it can be seen that this method of rapid fabrication is an important advantage, since individually inserting and fastening each bimetallic element 36 would greatly increase the fabrication cost.

Figure 5B:
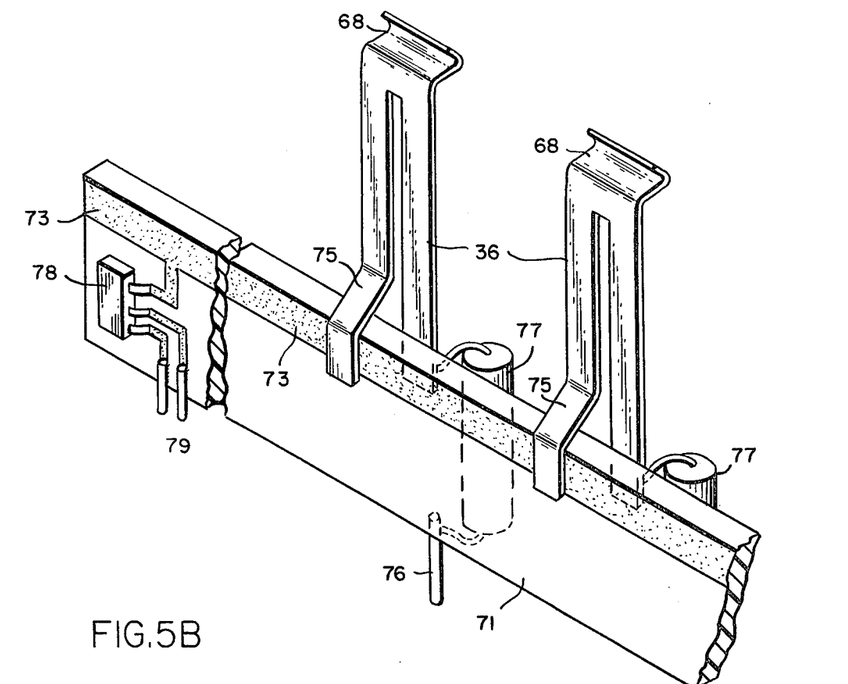

FIG. 5b shows an alternate method of assembly of the bimetallic elements 36. The bimetallic elements in FIG. 5b are those used in actuator embodiment illustrated in FIGS. 4a, 4b, and 4c. It should be appreciated, however, that the arrangements illustrated in FIGS. 5a and 5b may be used with other embodiments than those shown. In FIG. 5b, a number of co-linear bimetallic elements 36 associated with braille dots in corresponding columns of different rows are assembled onto a relatively long support member 71, typically formed of phenolic or other printed circuit material. A conductive strip 73 runs along the top edge of the support member 71. The individual bimetallic elements 36 have one leg thereof bent to formed an offset 75 between the two legs. One of the legs of each bimetallic elements is attached to the conductive strip 73, such as by soldering. Typically, the bimetallic elements are selectively activated by means of a decoder matrix, such as that shown and described below in connection with FIG. 9. In such a matrix, one leg of each of the bimetallic elements in a column are connected in common to a bus. This would correspond with conductive strip 73. When a bimetallic element in that column is to be actuated, the bus 73 is electrically connected to the appropriate voltage. Typically, this connection is performed by turning on a transistor or silicon-controlled rectifier. Where this method of enabling bimetallic elements is used, the transistor or SCR may be made a part of the assembly as illustrated by the semiconductor 78 attached to support member 71. One terminal from semiconductor 78 is electrically connected to conductive strip 73 while the remaining two terminals are connected to pins 79 which would be received by a motherboard which contains printed circuit conductors for interconnecting a plurality of assemblies. Generally, the decoder matrix will require a diode to be connected in series with each bimetallic element 36. In such a case, the diode may be made a part of the assembly as shown by diode 77 in FIG. 5b. Diodes 77 are connected between the second legs of the bimetallic elements and pins 76 which are also inserted into the motherboard and which receive the signals for activating the individual elements. Although only two bimetallic element are shown in FIG. 5b, it should be understood that in an actual device all the bimetallic elements in corresponding columns of different rows would be part of a single assembly.

As described above in connection with FIGS. 2a and 2b, after a first set of braille characters is displayed, any extended actuators 8 must be returned to their retracted positions prior to displaying the next set of characters. This is done by mechanically moving the extended plungers 16 in a downward direction to reengage pins 32 in holes 34. One method of performing this mechanical lowering operation is to provide a third plate beneath the bottom plate 20 to which each of the plungers 16 is attached. By lowering this plate a suitable distance, plungers which have been extended may be returned to the retracted position.

Referring to FIG. 4b, one example of the structure for performing this function is shown. A third plate 70, shown in dotted lines in the figure, is positioned below plate 20. Each of the plungers 16 extend a distance below bottom plate 20, and plate 70 has a plurality of holes therein arranged such that the plunger 16 of each of the actuators 8 extends through a corresponding hole 76 in plate 70, as shown in FIGS. 4b and 4c. By forming an enlargement 74 on the bottom of each plunger 16 after it has been inserted through the holes in bottom plate 70, all extended plungers among a large number of braille characters are simultaneously returned to the retracted position by lowering plate 70, as shown by arrow 72. If plungers 16 are formed from a thermally deformable plastic, the structure shown in FIG. 4b may be easily fabricated by inserting plungers 16 through holes in plate 70 and then heating the bottoms of plungers 16 while applying pressure to form the enlargement 74 at the bottom ends thereof. FIG. 4c shows an alternate method of returning plunger 16 to the nonactivated position. In FIG. 4c, the top plate 30 is moved in a downward direction, as illustrated by arrows 67. The underside of top plate 30 pushes plungers 16 in a downward direction until bimetallic elements 36 engage shoulder 24 to retain the bimetallic element in the retracted position.

Figure 6:
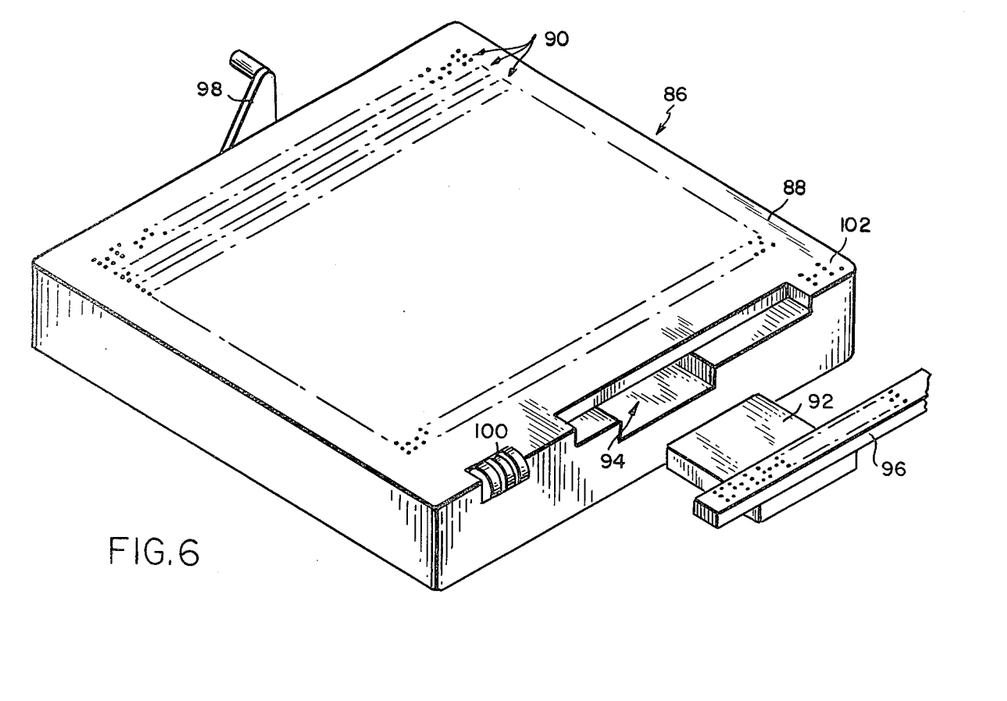
FIG. 6 shows the complete braille display unit.

Turning now to FIG. 6, a braille display unit 86 is shown which uses the novel actuators previously described to provide a system wherein braille characters stored on magnetic tape are displayed as tactilely-sensible characters on a surface which conforms to the standard page used in braille books. The top surface of the braille reader includes a plurality of actuators as described above arranged in 25 rows 90 of 40 braille characters each. The top surface 88 of the display unit 86 is approximately 11 by 11½ inches, corresponding with the size of pages in conventional braille books. In response to electronic information the reader shown in FIG. 6 presents an entire page of braille information. As described above, once the selected actuators 8 have been extended to display braille characters, these characters may be retained indefinitely without requiring further electric power.

In the embodiment shown in FIG. 6, information representative of the braille characters on a page is stored as digital data on a conventional magnetic tape cassette 92. This cassette is inserted into a tape transport 94 in the reader, and in response, pages of braille characters may be displayed as described below. It may be advantageous to provide a braille identification strip 96, which is attached to each cassette 92, so that a blind reader can identify a desired cassette. For 6,000 bits per page (1 bit per braille dot) and assuming a storage density of 800 bits per inch of tape, it requires approximately 7.5 inches of tape to store the information representative of one braille page. For a typical 350 foot long cassette of tape, approximately 560 pages of braille may be stored. A single page of conventional printed information requires approximately 2 braille pages, and each cassette contains the equivalent of 280 printed pages of information. Thus, most books can be stored on one or two cassettes.

A lever 98 is located on one side of the reader shown in FIG. 6. Lever 98 is a "page turner", and moving lever 98 causes the presently displayed braille page to be erased by mechanically retracting all actuators which are extended to display braille dots, as described below. Turning lever 98 further sends an electrical command to the tape transport 94 causing it to read the information on the tape corresponding with the next page. This information is applied to electronics which then display the next braille page on the top surface 88 of the braille display unit.

Three thumbwheel or other type of switches 100 are located on one side of the display unit 86. A braille reader may turn to a desired page other than the following page by indicating the number of the desired page via switches 100. In response, tape transport 94 searches for the designated page; and when the information representing that page is found, the page is displayed by the display unit 86. Switches 100 may be directly marked with braille characters identifying the selected page number. Alternatively, additional braille characters may be displayed as shown at 102 which are electronically actuated to indicate the page selected by thumbwheel switches 100.

Figure 7:
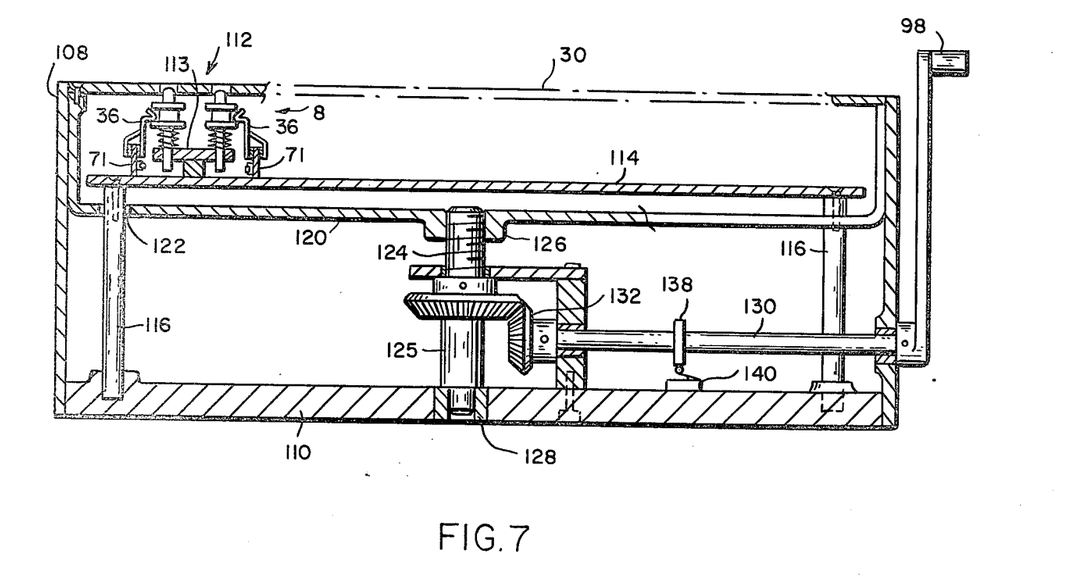
FIG. 7 shows the mechanism by which the braille display modules in a display unit are reset.

In FIG. 7 a sectional view of the display unit 86 is shown which illustrates the mechanism which resets the actuators 8 in the display unit in response to movement of page turner lever 98. The top surface 88 of the display unit 86 is formed by top plate 30 which has a plurality of holes there through corresponding with the possible position of braille dots. Top plate 30 is enclosed by sides 108 which provide support therefor and which may in turn be secured to base 110. Extending into the holes in top plate 30 are a plurality of actuators 8. Two representative actuators are shown at 112, although it should be appreciated that there are many other actuators which are not shown in FIG. 7 for the sake of clarity. Each of the actuators 8 includes plungers 16, bimetallic strips 36, and springs 22. Plungers 16 extend through holes in a supporting structure 113, which also serves as bottom plate 20 for each of the actuators 8. The support structures 113 for the different actuators are fastened to printed circuit board 114 which is supported by means of posts 116 or other suitable means.

The top plate 30 is attached to and positioned by a top plate support 120 located below printed circuit board 114 and attached to top plate 30. Posts 116 extend through openings in support 120 and serve to align the support with respect to printed circuit board 114 and top plate 30. Bushings 122 having a low coefficient of friction may be inserted in support 120 around posts 116 to allow the support to slide up and down easily.

The vertical position of support 120 is determined by means of a shaft 125, the top section 124 of which is threaded and extends into a corresponding threaded coupling 126 mounted on support 120. Threaded section 124 rotates within a bushing or bearing 128 located within base 110, and as shaft 125 revolves, the top plate support 120 is moved upward and downward by threaded portion 124 in cooperation with coupling 126.

Page turning lever 98 is attached to a second shaft 130 which extends through the side of the display unit 86 and terminates in a bevel gear 132. A second bevel gear 134 is attached to shaft 125 and is engaged by bevel gear 132. Moving lever 98 causes bevel gear 132 to turn gear 134 rotating shaft 125 and moving top plate support 120 and top plate 30 in a downward direction to retract plungers 16 thereby resetting all of the actuators 8 in the braille reader to the retracted position. Moving lever 98 also produces an electrical signal which is applied to the tape drive electronics. In response to this signal the tape drive reads out data representing the next page, and the reader electronics apply the proper signals to bimetallic elements 36 to display the next page. This electrical signal may be provided by an eccentric cam 138 on shaft 130 which actuates a switch 140 as lever 98 is turned to provide an electrical signal.

Figure 8:
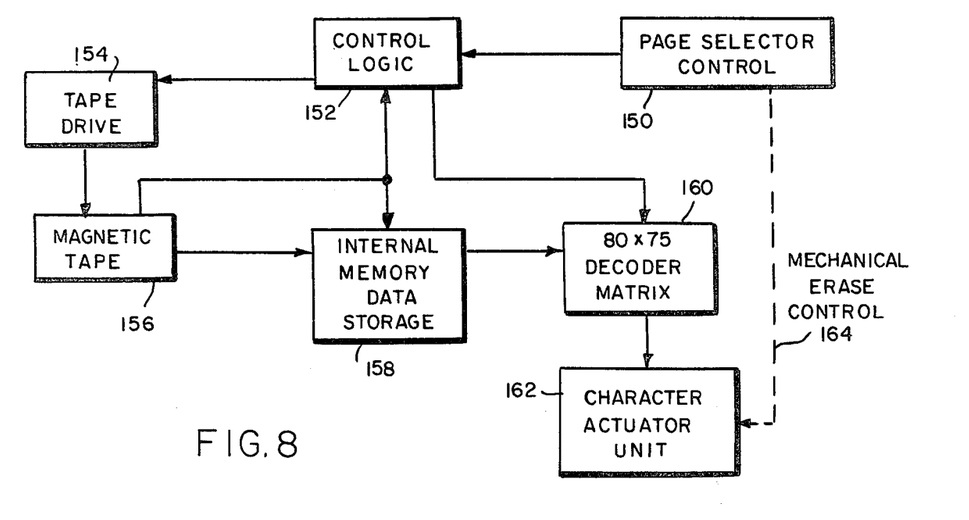
FIG. 8 is a block diagram of the electronic control circuitry of the braille display unit.

Referring to FIG. 8, there is shown a block diagram of the electronic control circuitry for the present invention. In response to signals from page turning lever 98 and from page selection switches 100, a page selector control 150 provides signals to control logic 152 indicating that a new page is to be displayed and which page, if other than the next sequential page. In response thereto control logic 152 applies signals to the tape drive control circuitry 154, which causes the tape transport to move the magnetic tape in cassette 92. When the next sequential page is displayed, the tape transport merely advances the tape to read the data representative of the next page. If a reader has selected a page other than the next sequential page, control logic 152 causes tape drive 154 to move the tape in the appropriate forward or backward direction; and the data from the magnetic tape 156 is monitored by control logic 152 until the proper page has been found.

Once the magnetic tape 156 is located at the beginning of of the proper page the data representative of the braille characters on that page is stored in an internal memory 158. The data stored in memory 158 is applied to a decoder matrix 160, described in more detail below. Decoder matrix 160 provides electrical signals to each of the actuators which display the individual braille dots; and in response to these signals, the appropriate plungers 16 are released. Once these plungers have been released, no more power is required to maintain the display; and the electronics are inactive until the reader designates that the next page is to be displayed by turning lever 98. This causes the present page to be erased by mechanically resetting each of the actuators units, as denoted by dotted line 164, and above the described process is repeated.

Each of the blocks shown in FIG. 8 represents electronic circuits which are well known to electrical engineers and which may be easily implemented to construct the control circuitry of the braille reader. However, one preferred method of implementing part of this circuitry is shown in FIG. 9.

Figure 9:
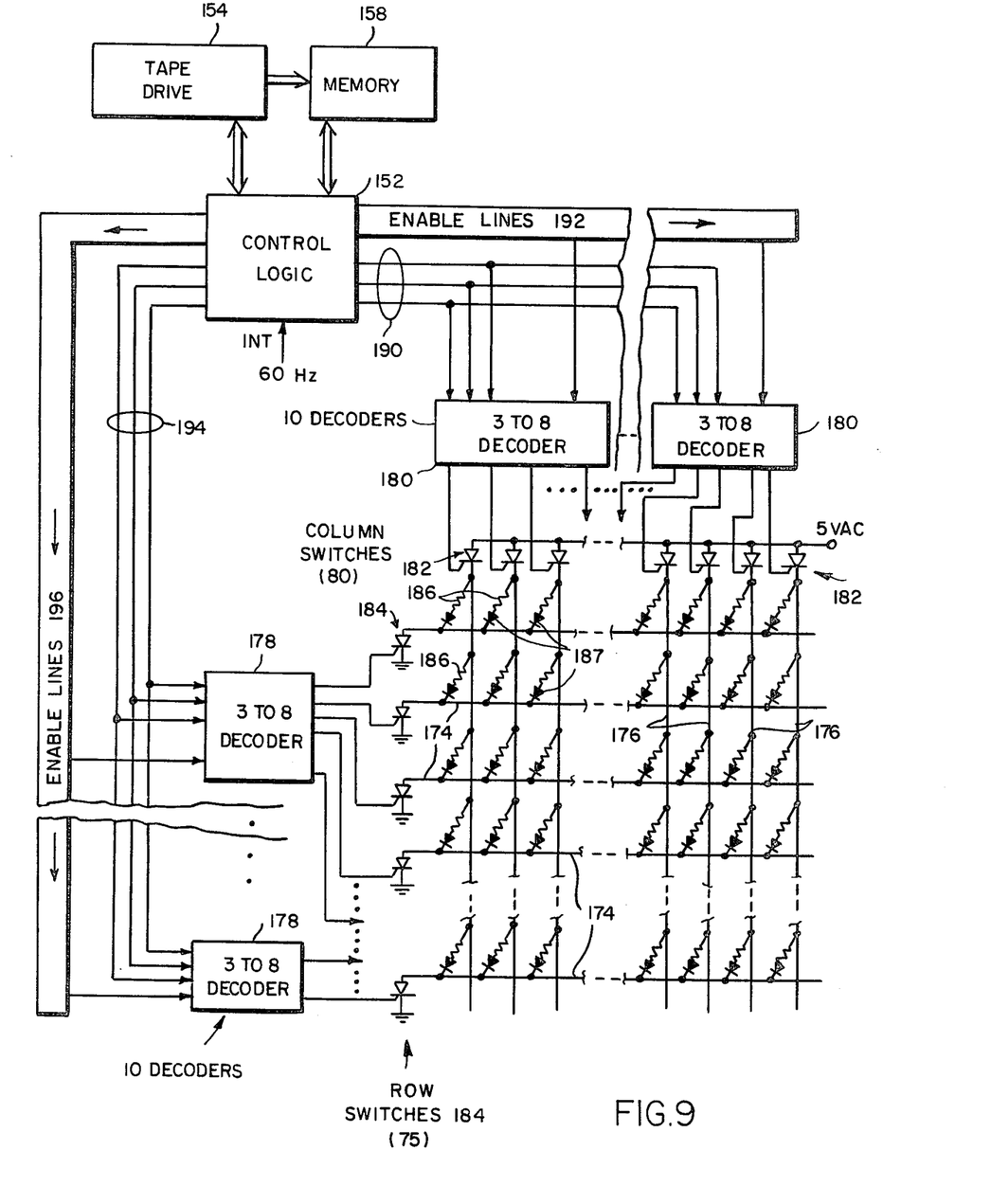
FIG. 9 is a schematic showing one circuit for implementing the decoder matrix of FIG. 8.

Referring to FIG. 9, in response to signals from control logic 152, data is read from the magnetic tape by tape drive 154, and this data is stored in memory 158. Typically, memory 158 stores data representative of an entire page of braille characters. The data stored in memory 158 is then sequentially read by control logic 152 which causes the proper signals to be applied to the bimetallic elements to display the desired braille characters, as described below.

In FIG. 9, in each bimetallic element is denoted by a resistor symbol 186 representing the resistance of that element. Each bimetallic element is connected in series with an associated diode 187. The bimetallic elements 186 are arranged in a matrix having 80 columns and 75 rows. In each column, one terminal of each bimetallic element and diode combination is connected to a bus 176 in common with the other bimetallic elements in that column. Each bus 176 is connected to an associated semiconductor switch 182. The switches may be implemented using silicon-controlled rectifiers, transistors, or other types of semiconductors switches. Mechanical relays or switches could also be used to perform this function. In the preferred embodiment described herein, switches 182 are implemented using silicon control rectifiers. Switches 182 will be referred to as the column switches, and in response to signals applied to the switch control terminal, each switch connects the associated column of bimetallic elements to a positive voltage source.

The second terminals of each diode and bimetallic element combination are connected to a series of buses 174. Each bus 174 provides a common connection for the bimetallic elements in each row. Each row 174 is connected to an associated row switch 184, similarly to column buses 176. Each row bus 174 has an associated switch 184 for a total of 75 row switches. In response to control signals applied to each switch 184, the switch selectively connects the second terminals of the bimetallic elements in the associated row to ground. In this manner, by providing the proper signals on the lines controlling the column switches 182 and row switches 184 a current may be applied to any single selected bimetallic element.

Control logic 152 selectively activates column switches 182 by means of signals on three address lines 190 and then enable lines 192. The 80 column switches 182 are divided into subgroups of 8 switches each, and the 8 control signals for the switches in each subgroup are supplied by a 3-to-8 decoder circuit 180. Ten decoder circuits 180 are used to provide the control signals for the 80 column switches 182. The enable lines 192 include one line for each decoder circuit 180, and when the enable line going to a particular decoder circuit is activated, that decoder circuit is enabled. Address lines 190 are connected to each of the decoder circuits 180, and the signals on address lines 190 designate which one of the 8 outputs of the decoder enabled by the signal on enable lines 192 is to be activated turning on the associated column switch 182.

In the embodiment described, when the braille reader is connected to the A.C. line voltages the power signal applied to column switches 80 is a 5-volt A.C. signal. Switches 182 and 184 are implemented by means of silicon-controlled rectifiers (SCR's). Relatively inexpensive SCR's are available which can handle the pulses of current applied to the bimetallic elements 186. The signal applied to each of the control line connected to the gate terminals of the SCR's need only be a short pulse to turn each SCR on during the proper half cycle of the 5-volt A.C. signal. At the end of the half cycle, the SCR is reversed-biased and turns off. The SCR will then remain off until a signal is again applied to the gate terminal during the proper half cycle of the A.C. signal.

Each of the 75 row switches 184 are selectively enabled in the same manner as the column switches 182. Three address lines 194 connect control logic 152 with each of ten 3-to-8 decoder circuits 178 to select one of the eight possible outputs from the decoder circuit. Control logic 152 enables a selected one of the decoder circuits 178 by means of individual enable lines 196 connecting the control logic with each of the decoders. The outputs from each of the decoder circuits 178 are applied to gate terminals of the SCR's to implement row switches 184.

The functions required of control logic 152 are principally causing data from the tape drive 154 to be stored in memory 158 and applying the appropriate signals to the matrix switches in response to the stored data. The functions of control logic 152 may be performed by many different types of digital data processing equipment, including microprocessors. Many microprocessors are commercially available which may be used in implementing the invention, and the general principles associated with the implementation and operation of these microprocessors are well known to those in the art. One microprocessor suitable for use with the present invention is the Pro-Log PLS-868 microprocessor system. This microprocessor is used in the embodiment described. This microprocessor is well known and widely available, and documentation of its structure and operation has been published and is available. For this reason, the detailed operation and structure of control logic 152 need not be further elaborated upon here. Other digital processors and microprocessors are suitable for use with the present invention, and the implementation of the present invention with a processor other then that described will be readily apparent to one of ordinary skill in art. Accordingly, the description of a particular processor in connection with the preferred embodiment is not to be construed as a limitation upon the invention.

In the preferred embodiment, a 60 Hz clock signal derived from the A.C. line voltage is applied to an interrupt input to control logic 152. This clock signal provides the proper timing information to control logic 152 so that the row and column switches may be activated synchronously with the A.C. signal which provides the power to the bimetallic elements 186. When the braille reader is being used in a portable mode, a 60 Hz oscillator provides the necessary interrupt signal to control logic 152, and the voltage applied to column switches 182 is a D.C. voltage derived from the battery power pack.

Figure 10:
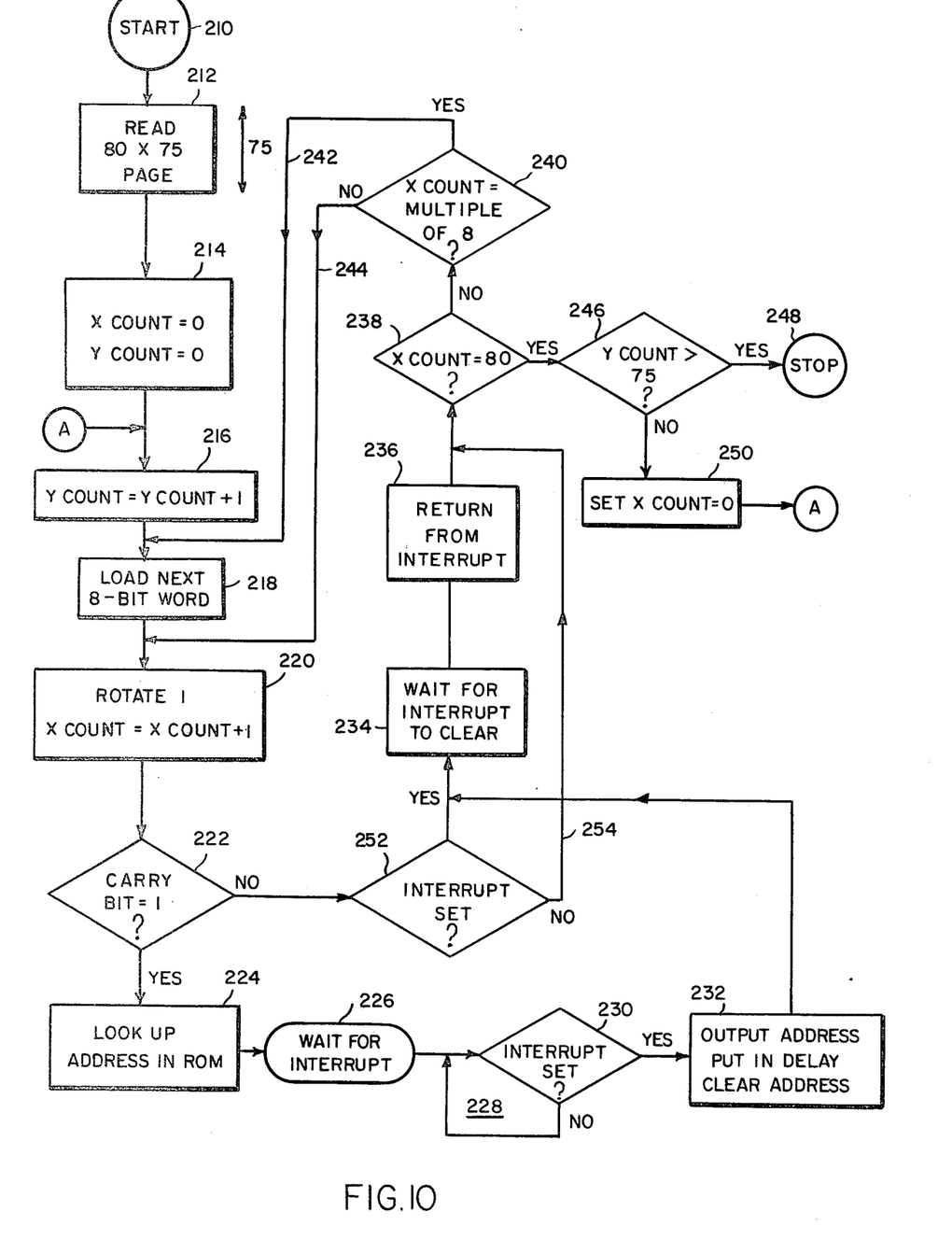
FIG. 10 is a flow diagram showing the operation of the display controller.

Referring to FIG. 10, a flow diagram is shown which illustrates a typical procedure by which control logic 152 carries out the above described functions. In response to a signal from page turning lever 98 the processor commences operation, denoted by block 210 in FIG. 10. First, the processor reads the data representative of a braille page from tape drive 154 and stores this information in memory 158, block 212. This information represents 75 rows of 80 braille dot positions each, the presence of a binary 1 in a memory location denoting a braille dot to be displayed. Next, the processor resets two index variables to zero, an X-COUNT variable which represents the column of a braille dot and a Y-COUNT variable which represents the row of a braille dot, block 214. To begin operation, the Y-COUNT variable is incremented by one, block 216.

At this time, the processor loads a register with eight bits of data from memory 158 representing the first eight braille dot positions in the first row of the braille page, block 218. Next, the eight bit character is rotated so that the first bit is shifted into the carry bit position, and the X-COUNT variable is incremented by one, block 220. The X-COUNT and Y-COUNT variables now represent the first braille dot position on the page. Next, the carry bit is tested, block 222. The presence of a one indicates that a braille dot is to be displayed. In this case the processor proceeds to block 224 and looks up in a read only memory the address, corresponding with the braille dot currently designated by the X-COUNT and Y-COUNT variables, which should be applied to address lines 190 and 194 and enable lines 192 and 196 to activate the appropriate bimetallic element 186. After this value has been determined, the processor waits for an interrupt, block 226. The interrupt is provided by the above-described 60 Hz clock signal and allows the processor to provide a signal to the row and column switches to turn them on during the proper half cycle of the 5-volt A.C. signal applied to column switches 182. To wait for the interrupt, the processor tests the interrupt to determine whether it has been set by the 60 Hz clock signal, block 230. This loop 228 is repeated until the interrupt is set.

Upon the setting of the interrupt flag, the address is clocked into decoders 180 and 178, block 232. The processor then waits for the interrupt flag to clear, block 234. This requires one half cycle of the 60 Hz clock signal, and during this time power is applied to the selected bimetallic element via the appropriate row and column switches. After the half cycle is finished, the processor returns from the interrupt subroutine, block 236.

The processor next checks the X-COUNT variable to determine whether an entire row has been completed, block 238. If not, the processor next checks to determine whether the X-COUNT is a multiple of eight, block 240. If so, a new eight bit word must be read from memory 158 and the processor proceeds to block 218 via path 242. Otherwise, the processor proceeds directly to block 220 via path 244 and test the remaining bits of the currently-loaded eight bit word.

If the X-COUNT variable equals 80 in block 238, an entire line has been displayed. In this case, the processor proceeds to block 246 where the Y-COUNT variable is checked to determine whether the entire page has been finished. If the Y-COUNT variable exceeds 75, the processor stops and waits for the next instruction from the reader, block 248. Otherwise, the X-COUNT variable is reset to zero, block 250; and the processor returns to block 216 to display the next row of braille dots.

If, in block 222, the processor determines that the presently addressed braille dot position is not to be displayed, the processor proceeds to block 252. In block 252 the processor checks to determine whether the interrupt flag is set. If the interrupt flag is set, it proceeds to block 234 and waits for the interrupt flag to clear. Otherwise it proceeds directly to block 238 and continues as described above to test the next dot.

The purpose of block 252 is to initially synchronize the processor operation with the 60 Hz clock applied to the interrupt input. The processor cycle time is on the order of a few microseconds or less, the interrupt flag is set for a period equal to one-half cycle of the 60 Hz interrupt clock, or 8.33 milliseconds. Thus, many digital zero's, representing non-displayed dots, may be tested by the processor before the interrupt flag is set again. A displayed dot essentially resynchronizes the processor to the 60 Hz clock; and in actual practice, once the processor is initially synchronized to the 60 Hz interrupt clock, a branch from block 222 to block 252 in response to data indicating a non-displayed dot always results in proceeding directly via path 254 to block 238. In this manner, the processor cycles quickly through the non-displayed dots.

Figure 11:
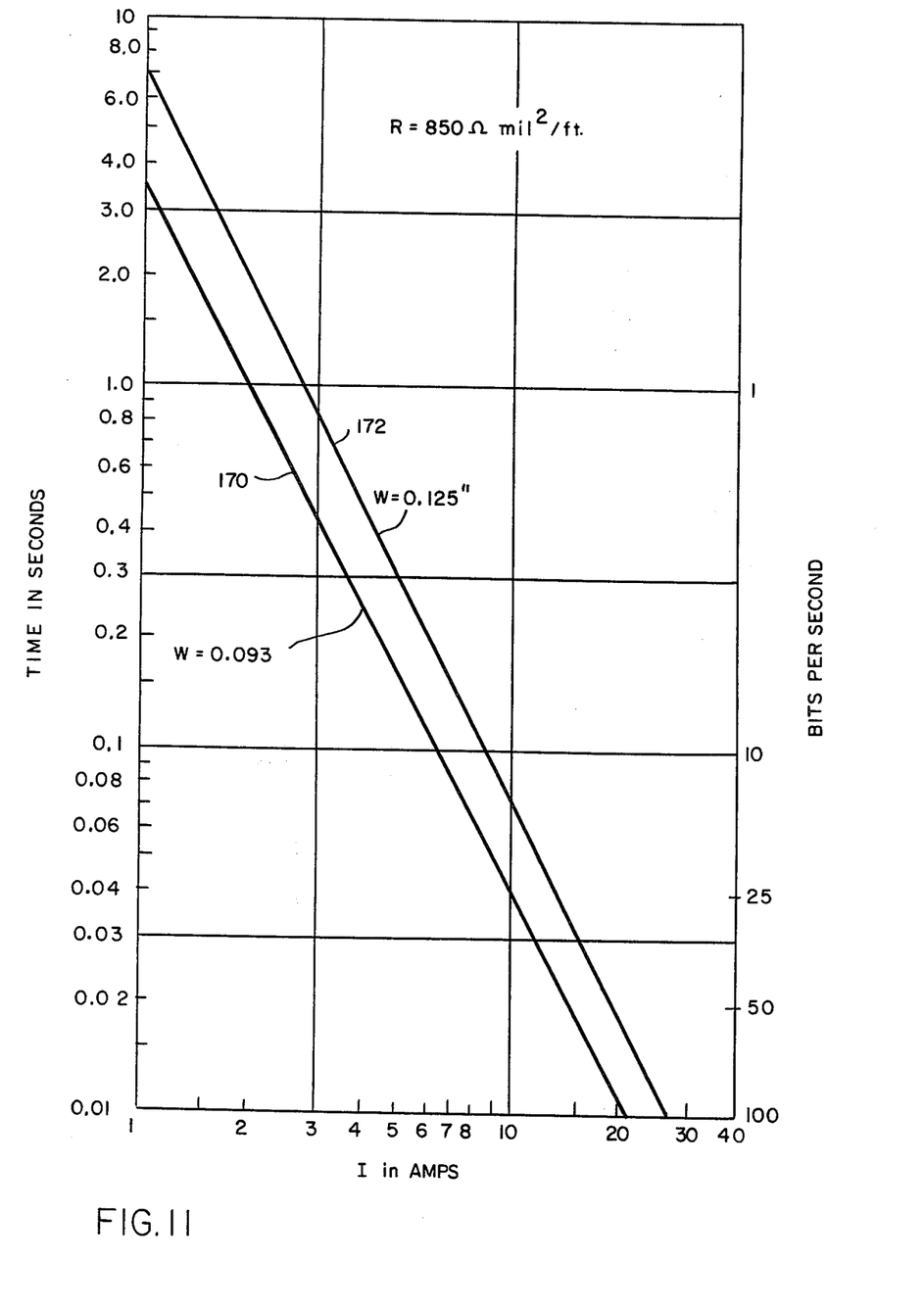
FIG. 11 is a graph of the current versus actuation time for a typical bimetallic element.

Each of the electronic blocks shown in FIG. 8 is of a type know by those in the art and be easily implemented. However, if the braille reader of the present invention is to be portable, certain power supply constraints should preferably be taken into consideration due to the limitations of available battery power packs. The time required to move each bimetallic element sufficiently to release the associated plunger is a function of the current I applied to the bimetalic element and is given by the following equation:

$$S = \frac{T(wt)^2}{(1.73 \times 10^{-9}) I^2 R} \quad (3)$$

where R is the electrical resistivity in ohm circular mils per foot, S is the time in seconds, and the remaining symbols are as defined above. For the Truflex material considered before, R equals 850. For a temperature rise $\Delta T$ of 75 degrees F., as before, the relationship between S and I is given by the graph shown in FIG. 11. The horizontal axis represents the current flowing through the bimetallic element 36. The vertical axis represents the time required for the bimetallic element to release the associated plunger in response to such current. Two lines are shown in FIG. 10 illustrating the relationship between the current and time. The line denoted as 170 illustrates this relationship for a design width of 0.093 inches, the width use in the present example. A second line 172 is included which illustrates the relationship for a design width of 0.125 inches.

Referring to equation 3, the power applied to an element is proportional to $I^2R$. The total energy required to produce a desired temperature rise is given by multiplying the power applied by the time for which it is applied. From equation 3, it can be seen that this product, $S \times I^2R$, is a constant for a given configuration and $\Delta T$, and thus the energy required to deflect an element is independent of the current level. (This is actually an approximation which is only valid for times short enough that the energy lost due to conductive and convective cooling is negligible with respect to the total energy input to the element.) However, since the time is inversely related to the square of the applied current, to activate a given number of elements in a given length of time, the average current required from the power supply can be reduced by pulsing each element at a higher current level for a shorter period of time. This apparent contradiction is explained by the fact that the higher current requires a larger power supply voltage; and since the total energy and power required is a constant, the higher average voltage drop across the bimetallic element results in a lower average current.

There has been described a unique device for displaying braille characters to a braille reader, which incorporates a novel actuator for producing each braille dot a bimetallic element as the active element. It should be appreciated that those of ordinary skill in the art may make modification and additions to the preferred embodiment disclosed herein which fall within the scope of the present invention. Accordingly, the present invention is only to be limited in accordance with the appended claims.

What is claimed is:

1. A device for displaying a plurality of braille characters, comprising:
   a surface on which the plurality of characters are displayed;
   means, cooperative with data storage medium having data stored therein representative of a plurality of braille characters, for reading the data representative of the braille characters from the data storage medium and for periodically producing electrical pulse signals representative thereof:
   display means for being thermally activated by said periodically-produced electrical pulse signals to cause a mechanical displacement to provide a tactilely-sensible representation of a plurality of braille characters;
   means for maintaining, after said display means is activated by said periodically-produced pulse signals, the tactiley-sensible representation of a plurality of braille characters currently provided thereby without the necessity of electrical power being applied thereto; and
   means for applying the electrical pulse signals from the reading means to the display means.

2. The device of claim 1 wherein the data storage medium includes magnetic tape; and
   wherein the means for reading includes a tape transport for moving the magnetic tape and for producing electrical signals representative of data stored on the magnetic tape.

3. The device of claim 2 further including means for producing a page turning signal in response to actuation by a braille reader;
   wherein the means for reading is further operative for reading data representative of a new plurality of braille characters in response to the occurrence of a page turning signal; and
   wherein the display means is further operative to display the new plurality of braille characters from the reading means in response to actuation of the page turning means.

4. The device of claim 1, 2 or 3 wherein the display means is operative for concurrently displaying at least 25 rows of braille characters, each row having at least 40 characters therein.

5. The device of claim 4 wherein the 25 rows of 40 characters are displayed on the surface within an area approximately 11 inches by 11½ inches.

6. The device of claim 1 wherein the braille characters are displayed on the surface arranged in a plurality of rows, each row having a plurality of characters therein.

7. A device for displaying to a braille reader a tactilely-sensible representation of a page of braille characters arranged in a plurality of rows of a plurality of characters in each row, each character being composed of six possible dots arranged in two columns of three dots in each column, each braille character being displayed by the presence of tactilely-sensible representations of braille dots for selected ones of the possible dots in each character, comprising:
   a top piece having a top surface and having a generally flat area on the top surface thereof on which the page of braille characters is displayed;
   means responsive to actuation by the braille reader for producing a page turning signal;
   means, responsive to the page turning signal and cooperative with a data storage medium having stored thereon data representative of a page of braille characters, for reading data representative of a page of braille characters from the data storage medium and for producing electrical signals representative thereof;
   a plurality of display means, each display means being activated in response to electrical signals applied thereto, for producing a tactilely-sensible representation of a dot, and each display means being associated with a respective one of the possible dots on said representation of a page of braille characters and being located substantially directly beneath the position on the top surface where the associated dot is displayed;
   control means responsive to the signals from the reading means for applying electrical signals to selected ones of the display means to cause the display means to produce representation of page of braille characters; and
   wherein each of the display means includes a bimetallic element to which are applied the electrical signals from the control means.

8. The device of claim 7 wherein the display means are further operative to maintain the representation of a page of braille characters without dissipation of electrical power after removal of the electrical signals applied thereto by the control means.

9. The device of claim 7 wherein each row of braille characters is further subdivided into three sub-rows of individual possible dots each sub-row including a respective dot, from each of the columns of each of the characters in that row;
   and wherein the control means further includes means for applying the electrical signals to the selected ones of the display means in an order in which the display means corresponding with the dots to be displayed are activated sequentially, the control means applying the electrical signals to consecutive display means to be activated in each sub-row and proceeding consecutively from each sub-row to the next sequential sub-row.

10. A device for producing a tactilely-sensible representation of a raised dot forming part of a braille character, comprising:
    a top piece having a generally planar surface and a hole therethrough;
    activation means, including a bimetallic element, for responding to a change in temperature by deforming from a first position to a second position;
    display means for being extended in said hole to provide a tactilely-sensible protrrusion above the surface of the top piece; and
    extension means responsive to deformation of the activation means from the first position to the second position for extending the display means to an extended position in said holes to provide the tactilely-sensible representation of a braille dot.

11. The device of claim 10 wherein the extension means is further operative to retain the display means in an extended position when the activation means returns to the first position.

12. The device of claim 11 wherein the extension means includes a spring-loaded plunger.

13. The device of claim 12 wherein the display means includes a pin mounted to the spring-loaded plunger and extending into the hole in the top piece.

14. The device of claim 13 wherein the spring-loaded plunger includes latch means for engaging the activation means when the activation means is in the first position to retain the plunger in a retracted position such that the pin within the hole does not extend above the surface of the top piece, and for disengaging the activation means when the activation means is deformed to the second position to allow the spring-loaded plunger to extend the pin thru the hole above the surface of the top piece.

15. The device of claim 14 wherein the latch means is further operative to reengage the activation means upon movement of the spring-loaded plunger from the extended position to the retracted position.

16. The device of claim 10, 11, 12, 13, 14, or 15 further including means for passing a current through the bimetallic element to provide resistive heating thereof, the bimetallic element deforming from the first position to the second position in response to such heating.

17. A device for producing a tactilely-sensible representation of a braille character made up of raised dots, comprising:
    a top piece having a plurality of holes therethrough, each hole corresponding with a possible position of a braille dot in a braille character;

an equal plurality of actuator means, each associated with a respective one of said holes and having first and second positions which can be tactilely differentiated, each of the actuator means including:
  a bimetallic element responsive to a change in temperature by deforming from an ambient-temperature position;
  a pin located within the associated hole; and
  extension means for moving the pin from a retracted position to an extended position in response to deformation of the bimetallic element to provide a tactilely-sensible representation of a braille dot; and
means for changing the temperature of selected ones of the bimetallic elements to provide a representation of a braille character.

18. The device of claim 17 wherein the extension means is further operative for maintaining the pin in the extended position when the bimetallic element returns to the ambient-temperature position.

19. The device of claim 18 wherein the means for changing the temperature includes means for selectively passing a current through the selected ones of the bimetallic elements to cause an increase in the temperature thereof.

20. The device of claim 19 wherein each of the actuator means includes first and second engagement means respectively attached to the extension means and to the bimetallic element of the actuator means, for retaining the pin in the retracted position as long as the bimetallic element is in the ambient-temperature position.

21. The device of claim 20 wherein the extension means includes a spring-loaded plunger connected to the pin.

22. The device of claim 21 wherein one of the spring-loaded plunger and the bimetallic element includes a latch pin attached thereto, and wherein the other of the spring-loaded plunger and the bimetallic element has a hole formed therein for receiving the pin to retain the spring-loaded plunger in a nonextended position when the bimetallic element is in the ambient-temperature position.

23. The device of claim 22 further including means for mechanically retracting the spring-loaded plungers of each of the extension means which is in an extended position;
  and wherein the latch pin is cooperate with the hole receiving the latch pin to reengage the latch pin when the spring-loaded plunger is retracted.

24. The device of claim 21 wherein the first engagement means includes a depression formed in the extension means for receiving the second emgagement means;
  and wherein the second engagement means includes a protrusion from the bimetallic element for engaging the depression to retain the associated extension means in the retracted position.

25. The device of claims 17, 18, 19, 21, 23, or 24, wherein the device is operative to produce tactilely-sensible representations of a plurality of braille characters, each character being composed of six possible dots arranged in a matrix of two columns of three dots each;
  the bimetallic elements of the actuators of each column being positioned beside the respective actuator in a direction away from the character.

* * * * *

UNITED STATES PATENT AND TRADEMARK OFFICE
CERTIFICATE OF CORRECTION

PATENT NO. : 4,266,936
DATED : May 12, 1981
INVENTOR(S) : Leonard Rose, et al.

It is certified that error appears in the above-identified patent and that said Letters Patent are hereby corrected as shown below:

Col. 8, line 16, insert --elements-- after "bimetallic".

Col. 13, line 14, change "then" to --ten--.

Col. 18, Claim 10, line 27, change "protrrusion" to
--protrusion--.

Signed and Sealed this

Second Day of March 1982

[SEAL]

Attest:

Attesting Officer

GERALD J. MOSSINGHOFF

Commissioner of Patents and Trademarks